Nov. 22, 1938.　　　R. J. GRAY　　　2,137,740
LUBRICANT DISPENSER
Filed Jan. 27, 1936　　2 Sheets-Sheet 1
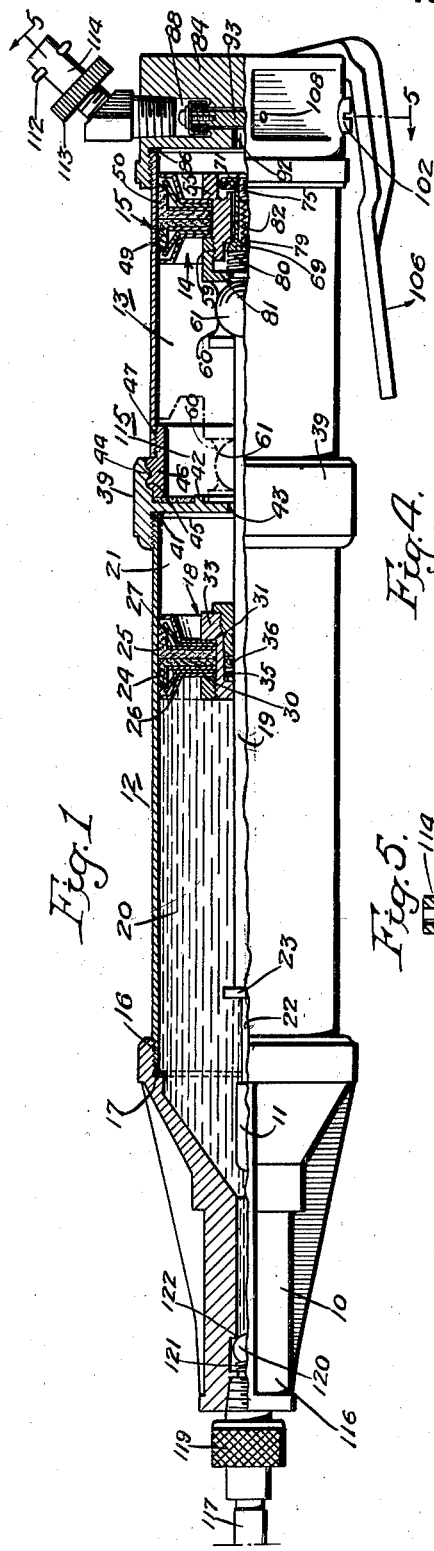
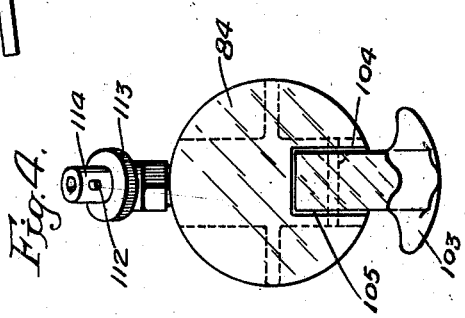
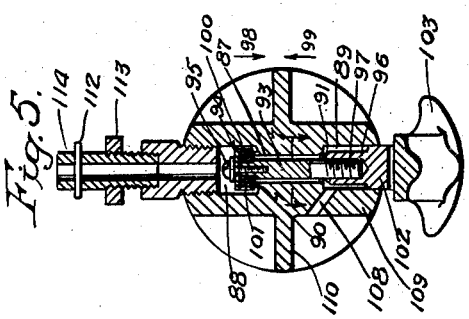
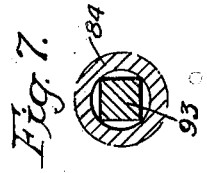
INVENTOR
Russell J. Gray
BY
Leonard L. Kalish
ATTORNEY Nov. 22, 1938.  R. J. GRAY  2,137,740
LUBRICANT DISPENSER
Filed Jan. 27, 1936   2 Sheets-Sheet 2
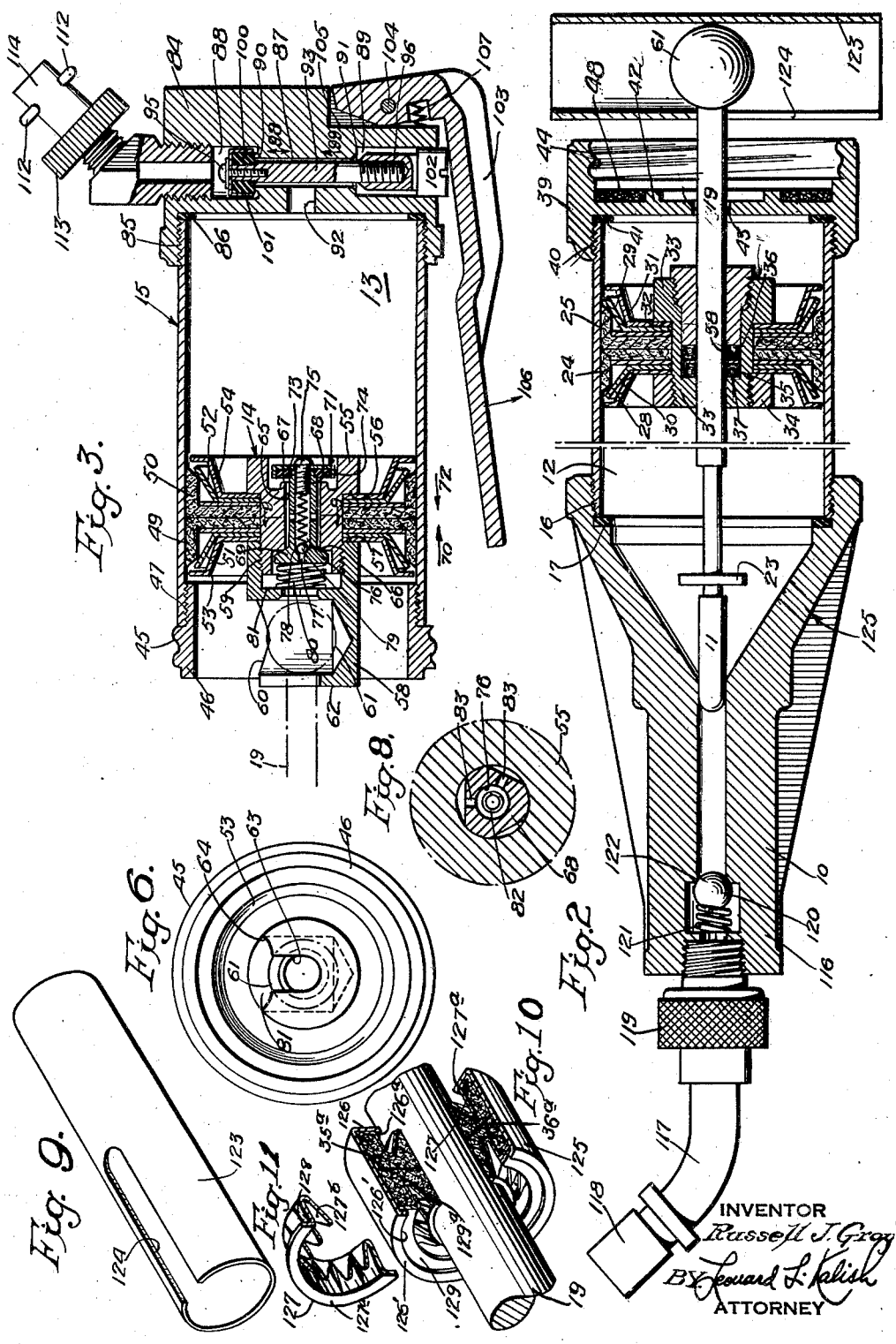
INVENTOR
Russell J. Gray
BY Leonard L. Kalish
ATTORNEY Patented Nov. 22, 1938

2,137,740

UNITED STATES PATENT OFFICE 2,137,740

LUBRICANT DISPENSER

Russell J. Gray, Minneapolis, Minn.

Application January 27, 1936, Serial No. 61,041

22 Claims. (Cl. 221—47.3)

The present invention relates to lubricant dispensing apparatus, many forms of which are sometimes referred to as "grease guns", and it relates more particularly to pneumatically operated or air powered lubricant dispensers for applying grease or other lubricants to the bearings of automobiles, and other machinery.

An object of the present invention is to utilize the source of pneumatic power, that is, the compressed air, not only for driving the high-pressure grease piston or lubricant piston through its operative or pumping stroke or ejecting stroke, as is done in now conventional pneumatically operated grease guns, but also to feed the lubricant supply to the high pressure lubricant cylinder (in which the high pressure lubricant piston operates), and also to retract the high-pressure lubricant piston through its return stroke by means of compressed air, so that the springs or other means commonly employed for feeding the lubricant to the high pressure lubricant cylinder and the springs and other means commonly employed for propelling or retracting the lubricant piston through its return stroke may be completely eliminated with certain resultant advantages, both in construction and mode of operation.

Another object of the present invention is to provide a quickly detachable and attachable connection between the air motor on one hand and the lubricant reservoir and high pressure lubricant piston on the other hand, whereby an operative connection may be maintained (that is, while the air motor is in the attached condition) between the air piston of the air motor and the lubricant piston both for propelling the latter through its operative stroke as well as through its retracting stroke.

A further object of the present invention is to provide a simpler and more economical and facile construction in grease guns with detachable air motors.

With the above and other objects in view which may appear more fully from the following detailed description and accompanying drawings, the present invention consists of a lubricant dispenser or grease gun comprising a lubricant cylinder and a lubricant piston adapted to operate within it to discharge the lubricant at the desired pressure, a lubricant reservoir in communicable relation to said lubricant cylinder, an air cylinder connected with said lubricant reservoir and lubricant cylinder in quick attachable and quick detachable relation thereto, an air piston within said air cylinder adapted for propelling said lubricant piston through its operative stroke or pumping or ejecting stroke, as well as through its return stroke, and means for admitting some of the supply of compressed air (which is used for operating the air piston through its ejecting stroke) into the lubricant reservoir and in front of the air piston, and for maintaining the air so admitted at an effective pressure less than the pressure of the compressed air supply, thereby to maintain a differential of air pressures on opposite sides of the air piston so as to return the air piston through its operative stroke without preventing the operation of the air piston through its forward or ejecting stroke, however, and so as also to maintain the desired pressure on the lubricant supply in the lubricant reservoir to feed such lubricant supply towards and into the lubricant cylinder.

For the purpose of illustrating the invention, there is shown in the accompanying drawings, one form thereof which is at present preferred, since the same has been found in practice to give satisfactory and reliable results, although it is to be understood that the various instrumentalities of which the invention consists can be variously arranged and organized and that the invention is not limited to the precise arrangement and organization of the instrumentalities as here shown and described.

Referring to the drawings in which like reference characters indicate like parts:

Figure 1 represents a partial sectional view of a lubricant dispenser or grease gun showing one embodiment of the present invention.

Figure 2 represents a side elevational view, in section, of the lubricant cylinder, lubricant piston, and lubricant reservoir and sectional lubricant-follower piston therein with the air motor detached.

Figure 3 represents a side elevational view of the air motor partly in section.

Figure 4 represents an end elevational view of the head end of the air motor.

Figure 5 represents a section on line 5—5 of Figure 1.

Figure 6 represents an end elevation of an air motor taken from the left of Figure 3.

Figure 7 represents a section on line 7—7 of Figure 5.

Figure 8 represents a section on line 9—9 of Figure 3.

Figure 9 represents in perspective a member which may be used as a handle to operate the lubricant piston when the air motor has been removed.

Figure 10 represents a partly sectioned view in perspective of another form of packing which may be employed between the follower piston and the piston rod in lubricant reservoir.

Figure 11 represents a cross-section in perspective of a spring member appearing in Figure 10.

In the particular embodiment of the present invention herein shown for the purpose of illustrating or exemplifying the present invention (although the invention is not limited to the specific embodiment herein shown), the lubricant cylinder 10 and its cooperating lubricant piston 11, are carried at one end, while the air cylinder 13 and its coacting air piston 14 (forming parts of the air motor designated generally by the numeral 15) are carried at the other end of a preferably cylindrical shaped lubricant reservoir 12.

In this particular embodiment of the present invention, the lubricant cylinder 10 is detachably secured to the lubricant reservoir 12 by means of suitable cooperating screw-threads 16 intermediate corresponding portions of the two members, with any suitable oil-resistant packing gasket or washer 17 interposed between the members for effecting a fluid-tight seal when the parts are screwed together. One object of this detachable connection is to permit the refilling of the lubricant reservoir 12 by temporarily detaching the lubricant cylinder member 10 and sucking the lubricant into the interior of the lubricant reservoir 12 by immersing the then free and open end of the lubricant reservoir 12 into the body of lubricant while the follower member or follower piston 18 is at the free or open end of the reservoir, and then manually retracting the follower piston or follower member 18 by pulling backwardly upon the piston rod 19.

The follower member or follower piston designated generally by the numeral 18 is provided within the lubricant reservoir 12 in order to permit the exertion of a feeding pressure upon the body of lubricant 20 in the reservoir (by means of the compressed air in the space 21) regardless of what position the apparatus is in, that is, whether it is in a horizontal position, or an upright position with its discharge end up or down, and also for the purpose of preventing the air (from the space 21) breaking through the body of lubricant 20 and entering the lubricant cylinder 10. The follower 18 is slidably mounted within the lubricant reservoir 12, and, in the particular embodiment of the present invention herein shown and described, the piston rod 19 extends through it and is also slidably related thereto.

The high-pressured lubricant piston 11 may be either rigidly connected with the piston rod 19 as in the particular illustration shown, or may be flexibly or loosely connected therewith through a more or less flexible means or coupling (of any of the now known forms of construction), so as to permit some degree of axial misalignment between the piston rod and the piston. In the particular embodiment of the present invention shown in the drawings, the piston 11 is connected with the piston rod 19 through the intermediate rod 22 of somewhat smaller diameter, which carries a loose annular flange or ring 23 slidable thereon between the larger diameters of the piston on one hand, and the piston rod 19 on the other hand, for the purpose of providing a shoulder of a diameter larger than the piston rod, which will at all times be capable of engaging the follower 18 for the purpose of retracting the follower for the suction refill operation heretofore mentioned, and which may slide towards the piston 11 so as to give the follower 18 the opportunity to move nearer to the discharge end of the reservoir 12 as the supply of lubricant therein diminishes.

The intermediate piston rod member 22 may be either made integrally with the piston 11 or may be made integrally with the piston rod 19, and is then connected with the other member through screw threaded or other suitable engagement, as for instance, by screw threading its free end, then correspondingly drilling and threading the other member (piston 11 or rod 19), with which it is to be connected.

The follower 18 is formed of two oppositely extending cup washers 24 and 25 formed of leather or other suitable oil resistant compositions of a flexible type which are confined between opposite metallic washers 26 and 27 and opposite radially expansible spring expanders 28 and 29, adapted to press the peripheral flanges of the washers outwardly against and into contacting engagement with the inner cylindrical surface of the lubricant reservoir 12 and the opposite metallic guide members 30 and 31, all of which are clamped between a suitable shoulder 32 on a sleeve 33 and the lock nut 34 threaded onto the opposite end of the sleeve. The radial expansible spring expanders 28 and 29 are preferably formed of a suitable thin sheet metal such as spring steel, phosphor bronze, or the like, which is dished in the general shape shown and with its flanges slit at suitable intervals around the periphery thereof, so as to permit the flange to extend outwardly by inherent tensions set thereinto in the shaping or dishing of the member; the slitting being preferably accomplished beforehand by another of the initially flat round discs with suitable V-notches around its periphery of a radial depth substantially equal to the depth of the flange desired. The guide members 30 and 31 are preferably solid metal, also preferably pressed of sheet metal with their outer peripheries at a diameter just sufficiently smaller than the inner diameter of the lubricant reservoir 12 to give a sliding clearance.

The piston rod 19 extends through the sleeve 33 of the follower 18 and may be "packed" therein or sealed in relation to the sleeve, by oppositely extending sealing washers 35 and 36 of leather or suitable oil resistant composition of generally U-shaped cross-section as indicated, with suitable metallic spring expanders 37 and 38 disposed therein, adapted to press the gaskets or washers both into contact with the rod 19 throughout its circumference and also against the inner surface of the sleeve 33 throughout its inner circumference, thus establishing fluid-proof seal in both directions, while permitting a freely-slidable relationship between the rod 19 and the follower 18.

In the particular embodiment of the invention herein shown the rear end of the lubricant reservoir 12 is provided with a quick-coupling cap member 39 which is more or less permanently secured to the end of the reservoir 12 by suitable fine screw threads 40 or other suitable more or less permanent fastening means with a suitable washer or gasket 41 interposed for airtight sealing. The cap 39 includes a transverse web 42 having a central opening 43 therein, sufficient to permit the passage of the piston rod 19 with enough clearance to permit free ingress and egress of air through the opening 43, but the opening being sufficiently close to the rod to afford the rod 19 guidance during the refill operation heretofore mentioned. If desired, however, the opening 43 may be made with just sufficient clearance to afford a sliding fit in relation to the rod 19, and instead, one or more additional openings or apertures of suitable size and location may be provided through the web 42 for permitting the free passage of air therethrough.

The opposite end of the coupling member or cap 39 is provided with any suitable quick-coupling means for establishing quick-detachable and quick-attachable engagement with the air cylinder 13. In the particular embodiment of the invention herein shown this quick-coupling means is in the form of a coarse pitch screw thread 44 of generally rounded cross-section, or what is sometimes generally referred to as "fruit-jar" thread. The corresponding end of the air cylinder 13 is provided with a complementary screw thread 45, which may be formed directly in the cylindrical body 13 or it may be formed in a separate sleeve 46, which is affixed to the cylinder 13 by means of the telescopic and screw threaded engagement indicated at 47; the sleeve 46 thereby also serving to confine the air piston 14 within the air cylinder 13 when the air motor is detached, as in Figure 3. The telescopic and screw threaded connection 47 is intended to be more or less permanent or fast, and is not intended for detachment in the normal operation of the apparatus but only for purposes of assembly and disassembly in the manufacture, repair or maintenance of the apparatus.

A suitable sealing gasket 48 is interposed between the end of the sleeve 46 and the transverse web 42 of the cap 39 for establishing an air proof seal between these members when the air motor is attached to the lubricant reservoir as in Figure 1. The air motor includes a double action piston designated generally by the numeral 14 formed of cup washers or gaskets 49 and 50, generally like the washers 24 and 25 heretofore described; spring expanders 51 and 52 generally being like the spring expanders 28 and 29 heretofore described and guide members 53 and 54 being generally like the guide members 30 and 31 heretofore described.

The several component members (49 to 54, inclusive), constituting the double action air pistons 14 are clamped together and are held together in operative relation to each other by a generally tubular valve housing 55 having a shoulder 56 which serves to engage the aforesaid piston members on one side, and the end 57 of the socket member 58 which serves to engage the aforesaid piston members on the other side; the valve housing 55 and socket member 58 being screw threadedly connected with each other as indicated at 59. While the component piston members 49 to 54, inclusive, are clamped together and held in operative relation to each other by screwing and tightening the socket member 58 onto the valve housing 55, it may also be said that the valve housing 55 and socket member or piston-coupling member 58 are carried by the air piston 14.

The socket member 58 is open at one side as indicated at 60 whereby a coupling ball or other suitable coupling member 61 may enter the socket side-wise, or in a generally radial direction from one side. The front end wall 62 of the socket is in turn provided with a generally axial opening 63 adapted to clear the rod 19 which then elongates side-wise in the direction of the side opening 60, as indicated particularly in Figure 6, and the terminal wall 62 is finally cut out as at 64 so as to give clearance to the ball or other coupling member 61, between the socket member 58 and the inner surface of the air cylinder 13 or the inner surface of the coupling sleeve 46 thereof (if a separate coupling sleeve 46 is provided on the air cylinder), also as indicated in Figure 6, so that the ball or other piston coupling member 61 may first enter between the socket 58 and the inner surface of the sleeve 46 in a direction parallel to the axis until it comes into alignment with the radial entrance opening 60 of the socket 58. The ball or other piston-coupling member 61 is preferably rigidly secured to the end of the piston rod 19 by screw threaded connection or otherwise, or may be formed integrally therewith.

The dimensions of the sockets are such that there are some clearances between the ball and the side walls or the contacting portions of the socket when the ball is disposed within the socket as shown in Figure 1.

The valve housing 55 is provided with a generally axial passageway or bore 65 therethrough, having opposite valve seats 66 and 67 formed at its opposite ends. A hollow or tubular valve stem 68 is slidably disposed within the valve opening 65 with sufficient clearances to permit the passage of air between the valve stem 68 and the bore 65 in which it slides. At one end of the valve stem the valve closure member 69 is provided, adapted to seat against the valve seat 66 in the direction of the arrow 70, while at the other end of the valve stem 68 the valve closure member 71 is provided adapted to seat against the valve seat 67 in the direction of the arrow 72. The effective distance between the two valve closure members 69 and 71 is slightly greater than the distance between the corresponding valve seats 66 and 67 so that when one of these valve closure members is set against its valve seat then the other valve closure member must be unseated from its valve seat but with the excess clearance between the two valve closure members being comparatively little so that a comparatively small axial movement of the valve stem 68 with its two valve closures 69 and 71 will not only unseat the one, but also seat the other one. This clearance, however, is nevertheless sufficiently great so that if the air is admitted gradually (in a manner to be described in more detail hereinafter), the valve stem closure member 69 may be unseated slightly in the direction of the arrow 72, to permit the passage of air in that direction, without, however, quite seating the valve closure member 71 (which seating would prevent such passage of air).

The valve closure member 71, in the particular illustration herein shown, may be formed of a more or less compressible washer 73 of fiber, leather, hard rubber, or other suitable washer composition, which is held in place by a cup-shaped metallic shell 74; the washer 73 and the shell 74 being fixed to the valve stem 68 by an assembly screw 75, threaded into the axial bore 76 of the valve stem 68.

The axial bore or aperture 76 of the valve stem 68 is reduced in diameter at its end nearest the air chamber 21, as at 77, whereby a valve seat 78 is formed between the two different diameters of the bore, against which a small valve closure member 79 of ball shape, or other suitable shape, is adapted to seat generally in the direction of the arrow 72. A helical compression spring or other suitable spring or resilient means 80 is interposed between the valve closure member 69 and the shoulder 81, formed in the socket member 58 or associated with the socket member 58, thereby resiliently or allowably to urge the valve stem 68 and the valve closure members 69 and 71 in the direction of the arrow 70, while another helical compression spring 82 is interposed between the valve closure member 79 and the inner end of the screw 75, resiliently or allowably to urge the valve closure member 79 in the direction of the arrow 72. The strength of the spring 80 is so proportioned to the effective diameter of the valve seat 66 that the valve closure member 69 may be unseated in the direction of the arrow 72 (and hence the valve stem 68 and valve 70 likewise displaced in said direction), by an air pressure entrance from the direction of the arrow 72 substantially less than the minimum pressure commonly available in the conventional sources of compressed air (assuming that the air pressure on the spring side of the valve closure 69 is atmospheric). Thus, assuming that the conventional sources of compressed air in garages and service stations available from air compressors and the compressed air storage tanks associated therewith, is between 150 and 160 to 175 pounds per square inch, the diameter of the valve seat 66 and the strength of the spring 80 would be so related to each other that the valve 69 would be unseated by an air pressure of about 80 pounds (more or less) in the direction of the arrow 72, so that air may be caused to enter from the air cylinder 13 through the valve housing 55, into the air chamber 21, behind the lubricant supply, regardless of the normal variations in air pressure in the conventional sources of compressed air supply.

The effective diameter of the valve seat 78 and the strength of the spring 82 are in turn so proportioned that the valve closure member 79 will be unseated in the direction of the arrow 70 by an air pressure of about twenty or thirty pounds (more or less) in the direction of the arrow 70 (assuming the air pressure on the spring side of the valve closure 79 to be atmospheric), that is, by an air pressure differential of twenty or thirty pounds (more or less) in favor of the air chamber 21 over the air cylinder 13. One or more radial passageways 83 connect the inner passageway 76 through the valve stem 68, with the exterior of said valve stem and with the clearance between such valve stem and the bore 65 in the valve housing 55, so that the unseating of the relief valve-closure 79 will permit the relief of air pressure from the air chamber 21, through the passageways 83 and the bore 65 and past the valve seat 67 and valve closure 71, into the air cylinder 13.

The cylinder head 84 is more or less fixedly secured to the cylinder 13 or may be formed integrally therewith.

In the particular illustration shown, the cylinder head 84 is screw threadedly attached to or connected with the cylinder 13 as indicated at 85; a suitable sealing washer or gasket 86 being provided between the connected members for effecting an air proof seal.

The cylinder head 84 contains a generally diametral valve passageway or bore 87, terminating in larger diameter openings 88 and 89, and having an intake valve seat 90 formed at one end, and an exhaust valve seat 91 formed at the other end thereof. A generally transverse opening or air passageway 92 connects the valve passageway 87 with the interior of the cylinder 13, from a point in said valve passageway intermediate the intake and exhaust valve seats 90 and 91 thereof.

Within the valve passageway 87 a valve stem 93 is slidably mounted with suitable clearance for the passage of air between the stem and the passage point. This clearance may be provided by forming the valve stem out of some suitable polygonal shaped cross section of maximum diametral dimension, sufficient to slidably fit within the valve passageway 87 as indicated in Figure 7.

To one end of the valve stem 93 the intake valve closure member 94 is secured by any suitable means, as for instance, the screw 95, while to the other end of the valve stem 93 the exhaust valve-closure member 96 is screw threadedly or otherwise secured, as indicated at 97. The intake valve 94 is adapted to seat against the intake valve seat 90 in the direction of the arrow 98, while the exhaust valve closure member 96 is adapted to seat against the exhaust valve seat 91 in the direction of the arrow 99. The effective distance between the two valve closure members 94 and 96 is slightly greater than the effective distance between the corresponding valve seats 90 and 91, so that when one of the valves is seated the other is unseated. The intake valve seat is preferably a raised annular seat, as indicated in Figures 1, 3 and 5, and the intake valve closure 94 is preferably a gasketed type of valve closure similar to the valve closure 71 having a more or less deformable packing gasket or washer 100 with a metallic retainer shell 101. However, any other suitable valve closure member may be used.

The valve closure member 96 preferably presents a tapered metallic contact surface to the valve seat as indicated in Figures 1, 3 and 5, and similar in that respect to the valve closure member 69 heretofore mentioned, while its corresponding exhaust valve seat 91 may be correspondingly tapered or may present a relatively narrow annular contact surface, approaching a sharp circular edge, so that comparatively little axial force upon the valve closure member 96 in the direction of the arrow 99 will produce comparatively great pressure per unit of the contact area between the valve closure member 96 and the corresponding valve seat 91 so as to effect a good seal with comparatively little axial force such as would be occasioned in the direction of the arrow 99.

The valve closure member 96 terminates in an enlarged terminal portion 102, which more or less snugly fits the diameter of the bore 89 in which the valve closure member 96 is disposed; with just sufficient closure however, to prevent free sliding movement within said bore. The terminal portion 102 extends preferably slightly beyond the cylinder head so that it may be engaged by being depressed from without, as for instance, by any suitable operating lever 103, which may be pivoted at 104. In the particular embodiment herein shown the lever 103, is generally L-shaped, with the short part of the L extending into a corresponding recess 105 provided in the cylinder head, in which it is then pivoted by the pivot pin 104. The pivoted part of the lever may be so arranged or proportioned in relation to the recess 105 that the movement of the lever in the direction of the arrow 106 is limited by the contact of a point of the lever with the bottom of the recess in the cylinder head. A small helical compression spring 107 may be provided between the lever and a part of the cylinder head to yieldably urge the lever at all times in the direction of the arrow 106. For this purpose the lever or the cylinder head may be recessed slightly to form a chamber in which the spring 107 may be retained. A vent hole 108 is provided from the bore 89 in the cylinder head through the wall 109, whereby the air may be vented out of the interior of the cylinder 13 whenever the valve is in the exhaust position shown in Figures 1 and 5. The vent hole 108 is preferably inclined or directed as indicated in Figure 5 so as to project the exhaust air away from the operated end, preferably against the web 110, forming a part of the cylinder head, which serves to break up the air jet issuing on the exhaust stroke of the air motor.

To the bore 88 of the cylinder head any suitable air connection, as for instance, the air connection 111, may be screw threadedly or otherwise secured, and having any suitable means, such as the bayonet pins 112 for receiving any quick detachable coupling means, such as a bayonet coupler on the end of an air hose for supplying compressed air to the air motor, as well as to the lubricant reservoir 12. Any suitable means, such as lock nut 113 having a knurled periphery may be threaded onto the bayonet connector member, or fitting 114, for locking the bayonet coupler in place after it has been telescoped over and onto the member 114 and connected with the pins 112 thereof.

By manually pressing the handle 103 in the direction of the air cylinder 13 the valve closure member 96 is pressed inwardly until it seats against the valve seat 91, thereby closing the exhaust and unseating the intake valve 94 from the intake valve seat 90, and admitting air past the intake valve seat and past the valve stem 93 and through the transverse opening 92 into the interior of the air cylinder 13. By releasing the grip on the handle 103 the handle 103 moves outwardly again in the direction of the arrow 106, both by reason of the spring 107, as well as by reason of the air pressure from the source of compressed air acting upon the intake valve closure member 94 in the direction of the arrow 98, as well as by virtue of the air within the cylinder 13 acting upon the exhaust valve closure member in the same direction. The valve, by virtue also of the simultaneous action of the two sources of air, acting on the two different valves in the same direction, the valve unit comprising the two valve closure members, and the intermediate valve stem 93, is moved quickly in the direction of the arrow 98, thereby to unseat the exhaust valve closure member, and to seat the intake valve closure member so as to shut off the source of compressed air supply, and to exhaust the compressed air from the cylinder 13.

In the dispensing operation of the apparatus, the air is admitted as above pointed out, into the interior of the cylinder 13. This tends to move the air piston 14 forward in the direction of the arrow 72. If the air chamber 21 in the lubricant reservoir 12, behind the lubricant supply 20, has no pressure in it as yet, or has not yet been charged with air (as for instance, when first starting to operate either on a freshly filled lubricant reservoir, or when first starting to dispense lubricant from a reservoir immediately after the air motor has been attached thereto), then a part of the first supply of compressed air admitted into the air cylinder 13 will pass through the air piston 14, that is, through the valves, and into the air chamber 21, thereby to charge such chamber with a supply of compressed air of sufficient pressure to exert a steady force upon the lubricant supply 20 (through the follower 18 in the particular embodiment of the invention herein shown), thereby to insure the rigid and certain intake of lubricant into the lubricant cylinder 10, as soon as the lubricant piston 11 is retracted to its intake position in each cycle in the operation of the device, and so as to exert a counterforce upon the air piston 14 in the direction of the arrow 70, so as to drive such piston, as well as the connected piston rod 19 and the piston 11 through the respective return strokes.

Thus, if the air pressure within the air or air reservoir 21 is below the predetermined pressure for which the apparatus is initially set through the proportioning of the springs as aforesaid mentioned, as for instance, when the air pressure within the chamber 21 is still atmospheric or has been partly dissipated through the displacement of the lubricant supply 20 and the corresponding enlargement of the air chamber 21, the compressed air admitted into the interior of the air cylinder 13 passes the initially unseated valve 71, and passes through the clearance between the valve stem 68 and the bore 65 and thus acts upon the disposed or effective area of the valve 69 tending to unseat it in the direction of the arrow 72 against the force of the spring 80, and possibly also against the additional force of whatever air pressure may be within the air chamber 21, which acts on a similar effective area of the valve 69 in the same direction as the force of the spring 80, in the direction of the arrow 70.

Thus, so long as the air pressure developed in the air cylinder 13 behind the air piston 14 by admission through the manually operable valve 94, (the pressure may be as high as the maximum pressure of the compressed air supply if the intake valve 94 is kept open long enough) exerts a force upon the valve 69 greater than the combined opposite forces of the spring 80 and the pressure of the air within the chamber 21, the air can be caused to flow from the air cylinder 13 into the air chamber or reservoir 21, and this flow may be continued until a balance between these two opposite forces on the valve 69 is obtained, or stating it more accurately, until the force of the incoming air acting in the direction of the arrow 72 is slightly overbalanced by the combined opposite forces acting in the direction of the arrow 70. For this reason, the pressure of the air within the chamber 21, and hence also the filling of the air in front of the air piston 14, that is, in the space 115, is always lower than the maximum pressure of the source of compressed air, so that the air piston 14 will be moved by the greater pressure of the source of compressed air, in the direction of the arrow 72, and against the pressure of the air in the communicating spaces 21 and 115.

As the pressure of the source of compressed air supply varies from time to time even over short intervals of time (as with a variety of pneumatically operated machinery, connected to the same source of compressed air), the pressure differential obtainable on the two sides of the air piston 14 which is utilized for driving the air piston 14 as well as the grease piston 11 through their operative strokes in the direction of the arrow 72 it may not be sufficiently great to develop the desired high pressure upon the grease being expelled, or upon the grease which the grease piston tends to expel. For this reason, as well as for generally insuring a greater differential between the pressure of the air in the spaces 21 and 115, and the pressure of the sources of compressed air supply, and thus to insure the grease pressure capacity desired of the apparatus, the valve 79 heretofore mentioned is provided for relieving the pressure in the spaces 21 and 115 to the desired extent, so that the pressure within the said spaces will always be kept down to the minimum necessary for feeding the grease supply 20 in the direction of the grease cylinder 10 and for returning the air piston 14 and the grease piston 11 through their return strokes in the direction of the arrow 70. Thus, assuming a fluctuating source pressure varying (during the period of operation of the device to be described) from a hundred pounds per square inch to one hundred and twenty-five pounds, and the strength of the spring 80 to be such in relation to the area of the seating-contact circle of the valve 69 as to balance a counter air pressure in the air cylinder 13 of eighty pounds per square inch, and the strength of the spring 82, to be such in the relation to the area of the seating contact circle of the valve 79 as to balance an air pressure of twenty pounds per square inch in the spaces 21 and 115, the operation (disregarding for the moment or temporarily assuming the non-existence of the valve 71) would be as follows:

If the pressure of the source of compressed air is no more than one hundred pounds, or if the pressure is one hundred pounds, but the full pressure of the source of compressed air is not utilized or developed in the air cylinder 13 behind the air piston 14 and not more than one hundred pounds per square inch is therefore developed in the air cylinder 13 behind the piston 14, by reason of the fact that the maximum grease pressure for which the apparatus is designed is not developed (due to the fact that the bearing to be lubricated does not resist the flow of lubricant therethrough to an extent sufficient to develop the maximum pressure for which the apparatus is designed), then the spaces 21 and 115 will be charged only to approximately twenty pounds per square inch due to the combination of eighty pounds of spring-produced pressure and twenty pounds of air pressure acting on the valve 69 in the direction of the arrow 70, to resist the ingression of charging air. If, however, a pressure substantially in excess of one hundred pounds is developed in the air cylinder 13 behind the air piston 14, then the spaces 21 and 115 will be charged to a correspondingly greater pressure. In this connection as well as in the consideration of the subsequent operative stages or steps, it must be borne in mind that the pressure to which the spaces 21 and 115 are charged may be vaguely regarded depending on the position of the air piston 14.

Thus, if the spaces 21 and 115 are charged to a pressure of twenty-five or thirty pounds while the air piston is at its ejecting stroke, that is, in the position farthest in the direction of the arrow 72 as shown in Figure 1, this pressure will be diminished below such initially charged pressure of twenty-five or thirty pounds each time that the air piston 14 is returned to the cylinder head 84 by the expansion of the air supply in the spaces 21 and 115; this reduction in pressure in the spaces 21 and 115 below the initially charged pressure, being dependent upon the degree of exhaustion of the lubricant supply 20 or the position of the follower 18 and hence upon the size of the air chamber 21 which varies inversely to the volume of lubricant supply 20. Thus with an initially charged pressure of twenty-five pounds, for instance, it may be possible that the air pressure in the spaces 21 and 115 is reduced to as low as twenty or perhaps even below twenty pounds per square inch when the piston 14 has been fully displaced towards the cylinder head 84. This is particularly true with a full lubricant supply 20 when the combined volume of the spaces 21 and 115 is at its minimum, and when therefore the expansion of the air supply in the spaces 21 and 115 required to return the piston 14 to the cylinder head is relatively the greatest.

If however the air pressure in the spaces 21 and 115, in the expanded condition thereof, that is, in the retracted position of the air piston 14, is still above twenty pounds per square inch or whatever pressure for which the spring 82 and valve seat 78 are proportioned or set, then at or near the exhaust stroke of the piston 14 (while the manual pressure on the handle 103 is released and the valves 94 and 97 are in the position shown in Figures 1 and 5) the valve seat 79 will be unseated (while the valve 69 has theretofore been seated) and all pressure in the spaces 21 and 115 (in the expanded condition of such spaces) in excess of the predetermined pressure for which the valve 79 is set, will be exhausted, past the valve 79, through the passageways 76 and 83 and through the clearance between the valve stem and bore 65 and past the valve seat 67 to the opposite side of the air piston 14 into the air cylinder 13 and out through the passageway 92, and through the valve seat 91 and exhaust opening 108.

The valve 71 on the other hand, is so arranged that if the air enters the air cylinder 13 through the valve 94 with a sudden flow or rush (as for instance, when the valve handle 103 is suddenly depressed to its full extent), the air flow passing the valve 71, after the pressure has unseated the valve 69, will cause the valve 71 to seat against the valve seat 77, thereby to shut off the flow which would otherwise take place past the valve 69. By reason of this auxiliary valve 71 the supercharging of the spaces 21 and 115, and the consequent relieving of the excess air pressure through the valve 79 is minimized, if not entirely eliminated, notwithstanding that the pressure of the source of compressed air supply may be substantially greater than the combined pressures of the spring 80 and the air in the spaces 21 and 115, because in the successive operations of the dispensing apparatus for successive charges of grease, comparatively little air can thus get by the valves 71 and 69, because the valve 71 tends to seat with any considerable air flow. However, when it is desired for any reason to charge the spaces 21 and 115 with air as for instance, just after the air motor has been applied to a lubricant reservoir, the valve handle 103 is depressed slightly (instead of fully), thereby to admit a very slow flow of air which will charge the spaces 21 and 115 without seating the valve 71. Once the spaces 21 and 115 have thus been charged, no further attention need be paid to the pressure condition of the spaces 21 and 115, because the slight amount of air which passes the valves 71 and 69 with each stroke (during the interval between the unseating of the valve 69 and the seating of the valve 71), is sufficient to keep the spaces 21 and 115 charged at all times while the valve 79 will likewise at all times relieve any excess pressure which may be developed.

As stated, owing to the fact that the volume of the spaces 21 and 115 varies with each stroke and also owing to the fact that the relieving of the pressure through the valve 79 can take place only after the pressure in the air cylinder 13 behind the air piston 14 has been adequately relieved through the exhaust valve seat 91, comparatively little or just a negligible amount of air need ever be relieved through the valve 79 in the normal operation of the device.

Thus, in the normal operation the air is admitted for each ejecting stroke into the air cylinder 13 behind the air piston 14 at a pressure higher than the pressure of the air in the spaces 21 and 115, thereby displacing the piston 14 and also the piston 11 in the direction of the arrow 12, and correspondingly compressing the air in the spaces 21 and 115. When the supply of compressed air is then shut off by releasing the valve handle 103 and by thus permitting the valve 94 to seat and the valve 96 to unseat, the piston 14 as well as the piston 11 is returned by the air in the spaces 21 and 115.

To the discharge end 116 of the lubricant cylinder 10 any suitable lubricant conducting conduit may be connected, having any suitable coupling means or nozzle at its end for making connection with any suitable lubricant receptacle grease cup or "fitting" or nipple connected with the bearing of the automobile or any other piece of machinery to be lubricated. In the particular illustration of the invention herein shown, a rigid discharge pipe 117 is shown having a suitable push-contact type nozzle 118 at its free end and a suitable strainer 119 associated therewith which may be of any suitable construction, as for instance, the nozzle construction and strainer construction disclosed in U. S. Patent No. 2,047,142, granted July 7, 1936, on copending application Serial No. 677,710, filed June 26, 1933. If desired, however, in lieu of the rigid conduit 117 a flexible hose-like conduit may be attached to the thread end 116 of the lubricant cylinder 10 with any suitable bayonet coupling or other hose or conduit coupling at the end of the hose for establishing quick detachable connection with any one of the many forms of lubricant "nipples" or grease cups of automobiles or other machinery.

In order to insure the full displacement of lubricant with each ejecting stroke of the lubricant piston 11, a suitable check valve 120 is provided at the discharge end of the lubricant cylinder 10, pressed by any suitable spring 121 against a suitable valve seat 122, so as to prevent any tendency of the lubricant to flow backward into the lubricant reservoir 12 as the pressure of the lubricant in the conduit 117 or hose-line leading from the cylinder increases.

In order to permit the ingress of lubricant into the lubricant cylinder 10 when the lubricant piston 11 has been fully retracted, the lubricant piston 11 has either retracted slightly beyond the bore of the cylinder 10, by suitably determining the length of the stroke of the piston 14, or the stroke of the piston 14 may be kept down, so that the piston 11 is not fully retracted from the bore of the cylinder 10, but instead the end of the piston 11 may be slotted so that the lubricant may enter through the slots; the slots being of sufficient axial depth to extend beyond the bore of the cylinder when the piston is retracted to its limiting position. Likewise, passageways or slight grooves may be provided in the entrance portion of the bore of the cylinder 10 so as likewise to admit lubricant into the cylinder 10 ahead of the piston 11, when the piston 11 has been retracted to its rearmost position.

In the use of present invention, a single air motor as shown, for instance, in Figure 3, may be used for several lubricant reservoirs or grease guns, as shown in Figure 2; the change of the air motor from one lubricant reservoir to another being accomplished quickly and easily by merely screwing and unscrewing the motor from the lubricant reservoir at the coarse pitch screw threads 44 and 45, and unhooking the socket 58 from the coupling ball or like member 61 and then reversing the operation on the next lubricant reservoir to which the motor is to be operatively attached. In this way, a series of different lubricant reservoirs containing a series of different lubricants or other fluids to be dispensed for different purposes, as for instance, chassis lubricant, water pump, fibrous lubricant, steering wheel lubricant, and universal joint lubricant, may be powered with the same air motor.

In order to refill the lubricant reservoir with greater ease, the tubular member 123 may be provided with a suitable slot 124 therein which may be slotted over the ball 61 after the air motor has been removed, and it then forms a more convenient handle by which a grip may be obtained on the rod 19 for sucking the grease into the front end of the lubricant reservoir in a manner heretofore mentioned; the handle member then extending generally transversely of the rod 19 at its outer end.

As heretofore mentioned, the reservoir may be filled by other means than the means heretofore indicated. Thus, it may be filled through a side opening provided in the casting of which the cylinder 10 is a part, as for instance, at the point 125, which may be provided with a suitable inwardly opening check valve, and also some additional closure screwcap or the like, whereby lubricant may be filled into the reservoir under some low pressure from any source of supply, as for instance, by the means shown in copending application Serial No. 583,159, filed Dec. 25, 1931, from a divisional application of which Patent No. 2,073,930 has since matured on March 16, 1937, and Figures 6, 10, 11 and 12 of which patent show said means.

Likewise, in the application of the present invention to larger sized apparatus, the lubricant reservoir may be of larger diameter and also perhaps of greater length, and hence of a capacity greater than what would ordinarily be carried about in the hands of the operator. In this larger sized equipment, the lubricant reservoir may be mounted first stationarily in an upright position or may be mounted in an upright position on wheels with the lubricant cylinder communicating with its lower portion and with the air motor detachably secured to its upper portion and with the piston rod extending through the reservoir from its upper portion to its lower portion and through the body of lubricant contained therein. In this larger embodiment, the follower 18 may be dispensed with since the reservoir will always be maintained in the same relative position, so that the lubricant will naturally flow toward the lubricant cylinder at all times under the influence of the air pressure. If desired, however, a loosely fitting follower plate may be superimposed upon the body of lubricant, particularly with the lubricants of the more viscous character, that is, those which are more or less stiff or paste-like, while with the more fluid or less viscous lubricants such loose fitting follower may be unnecessary. In such larger units, either of the stationary or "wheeled" type, the lubricant may be more readily filled in through the end of the reservoir farthest from the lubricant cylinder, that is, the end to which the air motor is attached. In such embodiments of the invention, air motors may be attached by a suitable lid-like member, corresponding to the member 46 or to the member 39, which would have a larger diameter than the motor itself, and would act as a cover or lid for the reservoir or the upper opening of the reservoir, to which it would be detachably secured by any suitable closure means or fastening means.

Likewise, in such larger forms of apparatus embodying the present invention, the manually operable handle 103 directly on the air motor may be replaced with remote control means, located in proximity to the discharge outlet of the coupler of the grease hose or lubricant hose which may be connected to the discharge end of the cylinder 10.

Thus, the air control valve may be operated through cable control, or the air control valve itself may be remote from the air motor and connected with it merely through a hose line or a double hose line in the general manner for instance shown in Reissue Patent No. 19,369, with the valve located in proximity to the grease outlet or the discharge end of the lubricant hose. Likewise, if desired, the admission of air into the air cylinder may be made automatic through any suitable automatic valve, so that the operation of the air motor would be continuous depending only upon the pressure in the grease hose or lubricant hose in advance of the lubricant piston 11. Any suitable automatic air control valve may be used in the cylinder head 84 for this purpose.

In the particular illustration shown, the cylinder head 84 and the cylinder 13 and the screw threaded terminal portion 46 are shown as being non-integral; the cylinder head 84 and terminal member or coupling member 46 are shown as being non-integral; the cylinder head 84 and terminal member or coupling member 46 being here shown as formed of castings, while the cylinder 13 is shown as formed of a pre-formed metallic tube, such as drawn steel tubing, or the like. If desired, however, these three members may be made integrally with each other of a single casting in which case the walls of the cylinder would possibly be slightly thicker and possibly reinforced with suitable external ribs. Likewise, while the quick detachable and quick attachable coupling means (as for instance, the coarse pitch screw threads 44 and 45) are shown as being between the terminal member 46 and the cap member 39, such coupling means may be provided directly between the cylinder member 13 or the terminal member 46, and the cylindrical shell of the reservoir 12. Thus, if desired, the coarse pitch screw thread 44 may be formed directly on the tubular shell 12 in place of the fine screw thread 40 (either externally or internally) by rolling the thread into the sheet metal wall of the reservoir 12, and the cylinder 13 or its terminal member 46 may be provided with a corresponding or complementary thread to engage directly with the reservoir 12. These are matters of design, however, in which a wide latitude may be permissible, within the scope of the present invention.

Likewise, a variety of different quick-coupling means may be provided in lieu of the screw threads 44 and 45, as for instance, various types of bayonet joints known in the arts, and various other types of coupling means, such as clamps, bolts, contractible clamping means, etc.

In the particular embodiment of the present invention, a valve or valves for passing air from behind the piston 14 to the space in front of the piston, are provided in the piston itself. The disposition of this valve or these valves may be varied and the valves may be provided exteriorly of the inner cylinder chamber 13, and in fact exteriorly of the cylinder 13, or the valves may be formed in the wall of the cylinder 13 (the wall being suitably thickened for that purpose), together with the necessary air passageways for passing the air from one side to the other. Thus, a suitable passageway may be provided exteriorly of the inner bore of the cylinder 13, which would by-pass around the piston 14, and in which passageway the valve or valves heretofore disclosed may be operatively disposed. This may be desirable if the cylinder head 84 were made integrally with the cylinder 13, and the terminal member 46, as for instance, in a single casting, wherein a generally longitudinal passageway could be provided communicating with the two ends of the cylinder and thus by-passing around the piston 14 and in which passageway the valves heretofore mentioned could be mounted, or if desired separate piping may be provided for carrying the air from one side of the piston to the other with the valves suitably mounted in the pipe line.

Likewise, as the double packing (35 and 36 of the follower 18), is merely to insure against the passage of air past the follower, along the piston rod 19, this double packing may be eliminated by merely a close slide fit of the bushing or sleeve 33 around the rod 19, and then providing a mild or weak spring bearing against the follower 18 and urging it in the direction of the arrow 72, because any differential fluid pressure on the two sides of the follower 18 favoring a fluid movement in the direction of the arrow 70, will prevent the passage of air in the direction of the arrow 72. Hence, a mild spring (which in and of itself may be insufficient adequately to feed the lubricant into the cylinder 10) interposed between the follower 18 and the transverse wall 42 may be used in lieu of the double packing (35 and 36). Further, in place of the double packing 35 and 36 having an intermediate gasket as illustrated in Figures 1 and 2, I may substitute a packing such as shown in Figure 11 in which the two cup leathers 35a and 36a are arranged to face in opposite directions enclosed in a cylindrical metal shell, one end of which is turned in to provide a relatively wide flange 126 having a bead 126a. Flange 126 is, however, not so wide but what it provides clearance between its inner edge and the rod 19 as appears clearly in Figure 11. The inner edge of flange 126 is turned at right angles to such flange as shown at 126a so as to parallel the outer shell 125 and to provide a lip for holding in place a spring means 127 comprising a thin ring 127a lying against the inner face of the flange 126. The spring means 127 is of generally V or channel form having slits 128 extending nearly to the ring 127a and forming nearly individual V-shaped spring sections 127b which expand the cup leather 35a against the rod 19. A similar spring means 127 is employed to expand the cup leather 36a against the rod 19, but the ring part 127a of the latter spring means is held in place within the shell 125 by a ring 129 parallel to the flange 126 and having an inturned lip 129a for assisting in holding the spring means 127 in place. The separable ring 129 is normally held in place to retain all the parts in the assembled position as shown by a short inturned flange 126' integral with the shell 125 and parallel to the flange 126.

Having thus described the invention, what is hereby claimed as new and desired to be secured by Letters Patent is:

1. Lubricant dispensing apparatus including a lubricant reservoir, compressed-air actuated means for forcing lubricant out of said reservoir and including a piston, and a valve for creating a differential air-pressure on opposite sides of said piston and for generally permanently entrapping air between said piston and the lubricant supply in said reservoir in operative relation to both and at a pressure substantially less than the pressure of the source of compressed air and means for limiting the pressure of the entrapped air.

2. Lubricant dispensing apparatus including a lubricant reservoir, compressed-air operated means for expelling lubricant from said reservoir including a piston, and means for transferring compressed air from the high pressure side of said piston to said lubricant reservoir and including a passage in said piston controlled by a reducing valve fluid-responsive in both directions and having its low-pressure side towards the lubricant reservoir and means for limiting the pressure of the entrapped air.

3. Lubricant dispensing apparatus including a lubricant reservoir, and compressed-air operated means for expelling lubricant from said reservoir and including a piston having a passage therethrough in communicating relation to said lubricant reservoir, and a double-acting air-actuated valve associated with said passage for checking a sudden rush of air through the piston toward said reservoir but to admit air to the reservoir through the piston under conditions of slow flow of the air.

4. Lubricant dispensing apparatus including a lubricant reservoir, a lubricant-expelling piston therefor and an air motor detachably connected to said reservoir for operating said piston and including an air-piston for acting upon one side thereof by successive and separate charges of compressed air admitted for each pumping stroke, quick detachable means connecting said second piston and said lubricant-expelling piston and interlockingly connecting such two pistons during both the expelling stroke and the non-expelling stroke and means for trapping and for retaining a supply of compressed-air on the opposite side of said air-piston throughout successive cycles of operation, for returning the air piston and said lubricant-expelling piston through their successive inoperative strokes.

5. Lubricant dispensing apparatus including a lubricant reservoir, compressed-air operated means for expelling lubricant from said reservoir, said compressed-air operated means being connected to said lubricant reservoir through quick detachable coupling means and including a piston, a single compressed air chamber intermediate the lubricant supply in said lubricant reservoir and said piston, and means for charging said air chamber with compressed-air from the source of compressed air for actuating said piston through its return stroke and for feeding said lubricant supply to said expelling means.

6. Lubricant dispensing apparatus including a lubricant reservoir and means for expelling lubricant therefrom including a detachable air-motor having a cylinder in axial alignment and in free pneumatic communication with said reservoir whereby the same air pressure will prevail in the adjoining spaces of said air-motor-cylinder and of said reservoir, and detachably coupled thereto end to end, said reservoir being generally imperforate and capable of maintaining air under pressure, and means for charging said reservoir with compressed air.

7. Lubricant dispensing apparatus including a lubricant reservoir having a lubricant pump cylinder and piston at one end thereof, an air-motor connected to the other end of said reservoir and including an air-cylinder and an air-piston, a follower in said reservoir; said air-cylinder and said reservoir being in free pneumatic communication with each other intermediate said air-piston and said follower, means for charging compressed air between said air-piston and said follower, a piston rod extending from said lubricant piston through and beyond said reservoir, and adapted to engage said follower when moved in one direction, and means at the end of said piston rod for interlocking engagement with the piston of said air-motor and also for manual grip for re-loading the lubricant reservoir by pulling back the follower therein.

8. Lubricant dispensing apparatus including a lubricant dispensing plunger having a rod associated therewith, and an air-motor having an air piston for operating said plunger, said air-piston having a socket with an entrance capable of being entered by motion in a plane transverse of the axis of said air-piston, and said rod having means engaging in such socket and adapted to enter thereinto by relative motion between socket and rod in a plane transverse of the axis of said air-piston.

9. Lubricant dispensing apparatus including a lubricant reservoir, an air-motor connected to said reservoir and having a piston provided with a passage therethrough, means whereby air may flow through said passage to said reservoir, a spring-tensioned valve in said passage arranged to open against the tension of said spring under the influence of air-pressure to permit flow towards said reservoir but to check flow away therefrom, and means for limiting the pressure in said reservoir.

10. Lubricant dispensing apparatus including a lubricant reservoir, an air-motor connected to said reservoir, and including a piston, said piston being provided with a passage therethrough, and double-acting opposed valves at the opposite ends of said passage adapted to check the flow therethrough in either direction, a stem connecting said valves whereby one valve is open when the other is closed, means whereby air may flow from said passage into said reservoir, and a spring tending to seat that one of said stem-connected valves which opens to allow flow of fluid through said passage to said reservoir.

11. Lubricant dispensing apparatus including a lubricant reservoir, an air motor connected to said reservoir and including a piston provided with a passage therethrough, double-acting opposed valves at opposite ends of said passage, a stem connecting said valves whereby one valve opens as the other shuts, a spring tending to seat that one of said stem-connected valves which opens to allow flow of fluid through said passage toward said reservoir, said last-mentioned valve having an opening therethrough, and a spring-pressed check-valve for closing said opening and adapted to open upon air-flow through the valve in the direction away from the reservoir.

12. Lubricant dispensing apparatus including a lubricant reservoir, compressed-air operated means for expelling lubricant therefrom, a reducing valve intermediate said reservoir and the source of compressed air for said expelling means, and spring-tensioned means for relieving air-pressure in said reservoir.

13. Lubricant dispensing apparatus including a lubricant reservoir, means for expelling lubricant therefrom, including a piston operated by compressed air, means for creating differential air-pressure on opposite sides of said piston for air-actuating said piston on its return stroke, and means whereby the lower of the two air-pressures acting on said piston is also freely applied to the lubricant in said reservoir for exerting feeding pressure thereon generally equal to the lower of said two air-pressures throughout the entire operative cycle.

14. Lubricant dispensing apparatus, including a lubricant reservoir, compressed-air actuated means for forcing lubricant out of said reservoir and including a piston, means for creating a differential air-pressure on opposite sides of said piston, and means whereby the lower of the two pressures acts generally continuously on said piston and also on the lubricant in said reservoir and tends to feed the lubricant therefrom under pressure generally equal to the lower of said two air-pressures throughout the entire operative cycle.

15. Lubricant dispensing apparatus including a lubricant reservoir, compressed-air-actuated means for expelling lubricant from said reservoir, said compressed-air-actuated means including an air-piston having a high pressure side and a low pressure side, an air chamber in communication with the low pressure piston side, an air-actuated valve in said piston for entrapping air in said chamber to actuate said piston on its return stroke, and means for limiting the pressure of the entrapped air.

16. Lubricant dispensing apparatus including a lubricant reservoir, an air-motor detachably secured to said lubricant reservoir in generally axial alignment therewith and including an air-cylinder and an air-piston therein; said air-cylinder and said lubricant reservoir being in free pneumatic communication with each other intermediate the side of the air-piston within the former facing the reservoir, and the lubricant supply within the latter.

17. Lubricant dispensing apparatus including a lubricant cylinder, a lubricant-expelling piston therein, an air-cylinder and an air-piston therein; said pistons being operatively related to each other whereby the air-piston may actuate the lubricant piston, and means for propelling said pistons through successive operative strokes by separate successive charges of compressed-air, and for propelling the same through their successive return strokes by generally the same charge of air.

18. Lubricant dispensing apparatus including a lubricant-ejecting piston, an imperforate air-cylinder, an air-piston therein, and means for subjecting said air-piston to relatively high pressure in one direction for propelling it through its ejecting stroke and for subjecting said air-piston to a relatively lower pressure in the opposite direction for propelling it through its returning stroke.

19. Lubricant dispensing apparatus including a lubricant reservoir, an air-cylinder associated with said lubricant reservoir having an air-piston therein, a lubricant cylinder in communicable relation to said lubricant reservoir and having a lubricant-ejecting-piston therein operable by said air-piston, said lubricant reservoir and said air-cylinder being in pneumatic communication with each other intermediate the lubricant supply in the former and the air-piston in the latter, and means for maintaining a supply of compressed air intermediate said lubricant supply in said reservoir and said air-piston in said air-cylinder at a pressure less than the pressure of the source of compressed air and adapted to exert pressure simultaneously upon the lubricant supply and upon said air-piston, to feed the former and to return the latter to its initial position after each operative stroke thereof.

20. Lubricant dispensing apparatus including a lubricant reservoir, compressed-air actuated means for expelling lubricant from said reservoir and including a piston having a high pressure side and a low pressure side, an air chamber adjoining the low pressure piston side and in free communication with the unoccupied space in said lubricant reservoir, and means for entrapping air in said chamber for returning said piston to its initial starting point and for feeding the lubricant in said reservoir to said expelling means, said entrapping means including a reducing valve operatively disposed between said chamber and the source of compressed air for said compressed-air actuated means.

21. Lubricant dispensing apparatus, including lubricant supply means, compressed-air actuated means for forcing the lubricant therefrom as desired, including an air-actuated piston and a lubricant-expelling piston operatively related thereto, and means for producing differential air-pressure on opposite sides of said air-actuated piston for actuating both said pistons through their non-operative strokes by the pressure of entrapped air; said differential-pressure-producing means being capable of maintaining a supply of compressed air for the return stroke of the piston throughout successive cycles of operation thereof.

22. Lubricant dispensing apparatus, including lubricant supply means, compressed-air actuated means for forcing the lubricant therefrom as desired, including an air-actuated piston and a lubricant-expelling piston operatively related thereto, said lubricant supply means being disposed between said air-actuated piston and said lubricant-expelling piston and means for producing differential air-pressure on opposite sides of said air-actuated piston for actuating both said pistons through their non-operative strokes by the pressure of entrapped air, whereby the same charge of entrapped air may actuate said piston through several successive return strokes thereof.

RUSSELL J. GRAY.